(12) United States Patent
Andou et al.

(10) Patent No.: US 10,047,777 B2
(45) Date of Patent: Aug. 14, 2018

(54) ANCHOR BOLT

(71) Applicant: HOWA CORPORATION, Amagasaki-shi, Hyogo (JP)

(72) Inventors: Kazuaki Andou, Amagasaki (JP); Toru Yanai, Amagasaki (JP)

(73) Assignee: Howa Corporation, Amagasaki-shi, Hyogo (JP)

( * ) Notice: Subject to any disclaimer, the term of this patent is extended or adjusted under 35 U.S.C. 154(b) by 0 days.

(21) Appl. No.: 15/322,783

(22) PCT Filed: Feb. 12, 2015

(86) PCT No.: PCT/JP2015/053773
§ 371 (c)(1),
(2) Date: Dec. 29, 2016

(87) PCT Pub. No.: WO2016/009666
PCT Pub. Date: Jan. 21, 2016

(65) Prior Publication Data
US 2017/0152879 A1  Jun. 1, 2017

(30) Foreign Application Priority Data

Jul. 15, 2014  (JP) .................................. 2014-144813
Aug. 27, 2014  (JP) .................................. 2014-172219

(51) Int. Cl.
*F16B 13/06* (2006.01)

(52) U.S. Cl.
CPC ............ *F16B 13/068* (2013.01); *F16B 13/06* (2013.01)

(58) Field of Classification Search
CPC ...... F16B 13/06; F16B 13/063; F16B 13/065; F16B 13/066; F16B 13/068; F16B 13/0841; F16B 13/0858

(Continued)

(56) References Cited

U.S. PATENT DOCUMENTS 3,221,590 A * 12/1965 Dickow ................ E21D 21/008
411/47
3,315,557 A * 4/1967 Dickow ................ E21D 21/008
29/513

(Continued)

FOREIGN PATENT DOCUMENTS

CA     1039986     10/1978
GB     2145493     3/1985

(Continued)

OTHER PUBLICATIONS

International Search Report issued in International Patent Application No. PCT/JP2015/053773 dated May 12, 2015.

*Primary Examiner* — Roberta S Delisle
(74) *Attorney, Agent, or Firm* — Barry E. Bretschneider

(57) ABSTRACT

An anchor bolt (40) according to the present invention has a taper member (7) threadably engaged with the rod (4), and three or five abutment parts (12) fitted over the taper member (7). The taper member (7) has a cross section in a form of an equilateral triangle or pentagon, and three or five inclined surfaces (10) at respective sides of the triangle or pentagon. The inclined surfaces (10) are inclined closer to a central axis of the taper member (7) toward a base end of the anchor bolt (40). Each abutment part (12) has an inner surface (11) which is inclined closer to the central axis of the taper member (7) toward the base end and which abuts the inclined surface (10) of the taper member (7). In a state in which the taper member (7) and the abutment parts (12) are inserted into the attachment bore (2), when only the taper member (7) is moved toward an opening of the attachment bore (2), the outer peripheral surface (15) of the abutment parts (12) are pressed against the inner peripheral surface (2a) of the attachment bore (2) so that the abutment parts (12) are fixed in the attachment bore (2).

5 Claims, 11 Drawing Sheets

(58) Field of Classification Search
USPC .................. 411/15, 18, 24, 44, 47, 49, 55
See application file for complete search history.

(56) References Cited

U.S. PATENT DOCUMENTS

| | | | | |
|---|---|---|---|---|
| 3,469,407 A * | 9/1969 | Kovacs | ................ | E21D 21/008 405/259.1 |
| 3,522,755 A * | 8/1970 | Michell | ................ | E21D 21/008 411/50 |
| 3,726,181 A * | 4/1973 | Dickow | ................ | E21D 21/008 411/50 |
| 4,100,748 A * | 7/1978 | Hansen | ................ | E21D 21/008 405/259.3 |
| 4,278,006 A * | 7/1981 | Lobello | ................ | F16B 13/066 405/259.3 |
| 4,337,012 A * | 6/1982 | Sohnius | ................ | F16B 13/066 411/3 |
| 4,516,885 A * | 5/1985 | Calandra, Jr. | ......... | E21D 21/008 405/259.3 |
| 4,523,880 A | 6/1985 | Isler | | |
| 4,538,940 A | 9/1985 | Isler | | |
| 4,753,559 A * | 6/1988 | Pentesco | ................ | B21D 35/00 405/259.3 |
| 4,772,166 A * | 9/1988 | Shamah | ............. | E04G 23/0222 405/259.3 |
| 4,968,200 A | 11/1990 | Mark | | |
| 4,969,778 A * | 11/1990 | Calandra, Jr. | ......... | E21D 21/008 405/259.3 |
| 5,028,188 A * | 7/1991 | Prince | ................ | F16B 13/066 405/259.5 |
| 5,076,733 A * | 12/1991 | Frease | ................ | F16B 13/066 405/259.1 |
| 5,078,547 A * | 1/1992 | Calandra, Jr. | ......... | E21D 21/008 405/259.5 |
| 5,087,160 A | 2/1992 | Pezzutto | | |
| 5,098,227 A * | 3/1992 | Wright | ................ | E16B 13/066 405/259.5 |

FOREIGN PATENT DOCUMENTS

| | | |
|---|---|---|
| JP | 58-203206 | 11/1983 |
| JP | 2-199308 | 8/1990 |
| JP | 9-303347 | 11/1997 |

* cited by examiner

ANCHOR BOLT

TECHNICAL FIELD

The present invention relates to an anchor bolt which is inserted into and fixed in an attachment bore provided in a rock wall surface or in a wall surface of a concrete ceiling and so on.

BACKGROUND ART

For example, as described in the Patent Publication 1, it is known that an anchor bolt is inserted into an attachment bore which is bored in a rock wall with a drill and fixed in the attachment bore.

Specifically the anchor bolt described in the Patent Publication 1 has a taper member (expansion nut) with six inclined surfaces, six abutment parts (leaves) which abut, the respective inclined surfaces of the taper member, and a rod (bolt) which is threadably engaged with an internal thread of the taper member.

After the anchor bolt is inserted into the attachment bore, the rod is turned to apply a pulling force to the taper member in a direction of removing the taper member from the attachment bore. Then, the taper member is moved toward an opening of the attachment bore (downward in FIG. 4 in the Patent Publication 1) to allow the inclined surfaces of the taper member to abut inner surfaces of the respective abutment parts and to push the abutment parts toward an inner peripheral surface of the attachment bore. Thus, outer peripheral surfaces of the abutment parts are pressed against the inner peripheral surface of the attachment bore so that the anchor bolt is fixed (secured) in the attachment bore.

PRIOR ART PUBLICATION

Patent Publication 1: Canadian Patent No. 1039986

SUMMARY OF THE INVENTION

Problem to be Solved by the Invention

In the anchor bolt described in the Patent Publication 1, the inclined surfaces are formed so that a cross section of the taper member is a equilateral hexagon (see FIG. 6 in the Patent Publication 1), and the abutment parts are disposed at respective sides of the equilateral hexagon of the taper member. Thus, every abutment part facing the other abutment part and the facing abutment parts push the inner peripheral surface of the attachment bore in vectorially and straightly opposite directions.

Namely forces are applied to the attachment bore so that the attachment bore is expanded by the facing abutment parts. Further, since these forces are arranged in the vectorially and straightly opposite directions, these forces are perpendicularly applied to the attachment bore. As a result, a crack may be caused in a concrete wall provided with the attachment bore, so that a securing force of the anchor bolt with respect to the attachment bore may decrease.

In the anchor bolt described in the Patent Publication 1, since the six abutment parts are arranged at the same height level (see FIG. 3 in the Patent Publication 1), forces pushing the inner peripheral surface of the attachment bore due to the abutment parts concentrate in a narrow range of the attachment bore (in a longitudinal range of the attachment bore). As a result, a crack may be caused in a concrete wall provided with the attachment bore, so that a securing force (fixing force) of the anchor bolt with respect to the attachment bore may decrease.

The present invention has been made for overcoming the above-stated inconvenience, and an object of the present invention is to provide an anchor bolt which can prevent a crack from being caused in a concrete wall provided with an attachment bore and which can be surely fixed in the attachment bore.

Means for Solving the Problem

In order to overcome the above-stated inconvenience, a first aspect of the present invention is an anchor bolt 40 which is inserted into and fixed in an attachment bore 2 provided in a wall surface 1 comprises a rod 4; a taper member 7 connected to the rod 4; and three or five abutment parts 12 fitted over the taper member 7; wherein the taper member 7 has a central axis, a cross section orthogonal to the central axis in a form of an equilateral triangle or pentagon, and three or five inclined surfaces 10 at respective sides of the triangle or pentagon, the inclined surfaces being inclined closer to the central axis of the taper member 7 toward a base end of the anchor bolt 40, wherein the number of the abutment parts 12 is the same as the number of the inclined surfaces 10 of the taper member 7, and each of the abutment part has an inner surface 11 which is inclined closer to the central axis of the taper member 7 toward the base end and which abuts the inclined surface 10 of the taper member 7, and wherein in a state in which the taper member 7 and the abutment parts 12 are inserted into the attachment bore 2 from a tip side of the anchor bolt 40, when only the taper member 7 is moved toward an opening of the attachment bore 2, the abutment parts 12 are pushed toward an inner peripheral surface 2a of the attachment bore 2 due to the inclined surfaces 10 of the taper member 7, and outer peripheral surfaces 15 of the abutment parts 12 are pressed against the inner peripheral surface 2a of the attachment bore 2 so that the abutment parts 12 are fixed in the attachment bore 2.

The wall surface 1 may be that of a ceiling, side wall and so on, which are included in a civil structure, such as a rock wall and a tunnel, and an architectural structure. In order to connect the rod 4 with the taper member 7, the rod 4 may be welded to the taper member 7. The number of the inclined surfaces 10 of the taper member 7 and the number of the abutment parts 12 are determined according to whether the cross section of the taper member 7 is the equilateral triangle or the equilateral pentagon. The abutment parts 12 may be pressed against and held on the inner peripheral surface 2a of the attachment bore 2, for example, due to an elastic force of the bridge 13 connecting the abutment parts 12 with each other, to move only the taper member 7 toward the opening of the attachment bore 2, or, the abutment parts 12 may get stuck and be held on the inner peripheral surface 2a of the attachment bore 2 to move only the taper member 7 toward the opening of the attachment bore 2.

Specifically, the rod 4 may have an outer peripheral surface formed with an external thread 3, the taper member 7 may have an internal thread 6 along the central axis, and the rod 4 may be connected to the taper member 7 by threadably engaging the external thread 3 with the internal thread 6.

In order to overcome the above-stated inconvenience, a second aspect of the present invention is an anchor bolt 50 which is inserted into an attachment bore 52 provided in a wall surface 51 from a tip side of the anchor bolt 50 and is fixed in the attachment bore 52, comprises a rod 54; at least two taper members 57a, 57b connected to the rod 54 so as to be close to each other; and an expandable member 58 fitted over the taper members 57a, 57b together; wherein each taper member 57a, 57b has a central axis and an outer peripheral surface formed with inclined surfaces 60 inclined closer to the central axis of the taper member 57a, 57b toward a base end of the anchor bolt 50, wherein the expandable member 58 has a plurality of abutment parts 62 and a bridge 63 connecting the abutment parts 62 with each other, each abutment part 62 having an inner surface 61 which surface-contacts the inclined surface 60 of the taper member 57a, 57b, wherein the bridge 63 has a main body 63a disposed closer to a tip of the anchor bolt 50 than the taper members 57a, 57b, and a plurality of connecting parts 63b, 63c, the connecting parts 63b, 63c extending from a peripheral edge of the main body 63a toward the respective abutment parts 62 and have respective free ends connected to tips of the respective abutment parts 62, and wherein in a state in which the taper members 57a, 57b and the expandable member 58 are inserted into the attachment bore 2, when the taper members 57a, 57b are moved toward an opening of the attachment bore 52, the abutment parts 62 are pushed toward an inner peripheral surface 2a of the attachment bore 2 due to the inclined surfaces 60 of the taper members 57a, 57b, and outer peripheral surfaces 65 of the abutment parts 62 are pressed against the inner peripheral surface 2a of the attachment bore 2 so that the abutment parts 62 are fixed in the attachment bore 2.

The wall surface 51 may be that of a ceiling, side wall and so on, which are included in a civil structure, such as a rock wall and a tunnel, and an architectural structure. The number of the taper members 57a, 57b may be large, but the number of the taper members 57a, 57b is preferably two, because the larger this number is, the more complex the production of the anchor bolts 50 is.

In order to connect the rod 54 with the taper members 57a, 57b, the rod 54 may be welded to the taper members 57a, 57b, or, each taper member 57a, 57b may have an internal thread 65, the rod 54 may have an outer peripheral surface formed with an external thread 53, and the rod 54 may be connected to the taper members 57a, 57b by threadably engaging the external thread 53 of the rod 54 with the internal thread 56 of each taper member 57a, 57b.

Regarding the matter that the taper members 57a, 57b are close to each other, the taper members 57a, 57b may contact each other or may be spaced by a slight clearance. The taper members 57a, 57b may be moved toward the opening of the attachment bore 52 together with the rod 54 by moving the rod 54 toward the opening of the attachment bore 54, or, only the taper members 57a, 57b may be moved toward the opening of the attachment bore 52 by threadably engaging the external thread 53 of the rod 54 with the internal thread 56 of each taper member 57a, 57b and turning the rod 54.

Specifically viewing from the tip of the anchor bolt 50, the abutment parts 62 facing the inclined surfaces 60 of one of the taper members 57a are offset in a circumferential direction of the taper members 57a, 57b from the abutment parts 62 facing the inclined surfaces 60 of the other taper member 57b adjacent to the one of the taper members 57a.

Specifically, for each taper member 57a, 57b, three or five inclined surfaces 60 of the taper member 57a, 57b and three or five abutment parts 62 facing the respective inclined surfaces 60 may be provided, the inclined surfaces 60 of the taper members 57a, 57b and the abutment parts 62 facing the respective inclined surfaces 60 may be equally spaced in the circumferential direction of the taper members 57a, 57b, and viewing from the tip of the anchor bolt 50, the abutment parts 62 facing the respective inclined surfaces 60 of the other taper member 57b adjacent to the one of the taper members 57a are disposed between the abutment parts 62 facing the respective inclined surfaces 60 of the one of the taper members 57a.

Effects of the Invention

In the anchor bolt 40 according to the first aspect of the present invention, when only the taper member 7 is moved toward the opening of the attachment bore 2, the inclined surfaces 10 of the taper member 7 abut the inner surfaces 11 of the abutment parts 12 and surely push the abutment parts 12 toward the inner peripheral surface 2a of the attachment bore 2 so that the outer peripheral surfaces 15 of the abutment parts 12 is properly pressed against the inner peripheral surface 2a of the attachment bore 2 due to the inclined surfaces 10 of the taper member 7 and the abutment parts 12 is surely fixed to the attachment bore 2.

Since the abutment parts 12 are arranged at respective sides of the equilateral triangle or pentagon in the cross section of the taper member 7, a force 21 pushing the inner peripheral surface 2a of the attachment bore 2 due to each abutment part 12 (referred to as "pushing force" hereinafter) is not vectorially and straightly aligned with any other pushing forces 21 due to the other abutment parts 12 (FIG. 5). Thus, one abutment part 12 and the other abutment part 12 do not push the inner peripheral surface 2a of the attachment bore 2 in the vectorially and straightly opposite directions, and the inner peripheral surface 2a of the attachment bore 2 is not excessively expanded so that a crack is restricted from being caused in a concrete wall provided with an attachment bore 2. As a result, a securing force of the anchor bolt with respect to the attachment bore 2 is prevented from decreasing due to such a crack. In a state in which the abutment parts 12 are expanded, a contacting area between the abutment parts 12 and the inner peripheral surface 2a of the attachment bore 2 is larger when the number of the abutment parts 12 is three than when it is five, and is larger when it is five than when it is seven. Accordingly, a force pushing the inner peripheral surface 12a of the attachment bore 12 by one abutment part 12 is larger when the number of the abutment parts 12 is three than when it is five, and is larger when it is five than when it is seven.

When the rod 4 is connected with the taper member 7 by threadably engaging the external thread 3 of the rod 4 with the internal thread 6 of the taper member 7, the taper member 7 can be moved toward the opening of the attachment bore 2 due to screwing action with an easy operation of merely turning the rod 4.

When five inclined surfaces 10 of the taper member 7 and five abutment parts 12 are provided, the forces 21 of the abutment parts 12 pushing the inner peripheral surface 2a of the attachment bore 2 are properly distributed in a circumferential direction so that each abutment part 12 can be surely fixed to the attachment bore 2, while a crack can be surely prevented from being caused in a concrete wall provided with the attachment bore 2.

In the anchor bolt 50 according to the second aspect of the present invention, each taper member 57a, 57b can be moved toward the opening of the attachment bore 2, and since each abutment part 62 is pressed against the inner peripheral surface 52a of the attachment bore 52 due to the taper member 57a, 57b so that each abutment part 62 is firmly fixed in the attachment bore 2, the anchor bolt 50 is firmly fixed in the attachment bore 2 in the wall surface 1 due to each abutment part 62.

Since a plurality of abutment parts 62 are arranged so as to be distributed to the taper members 57a, 57b (distributed in a longitudinal direction of the rod 54), forces pushing the inner peripheral surface 52a of the attachment bore 52 due to the abutment parts 62 (referred to as "pushing force" hereinafter) is distributed in the longitudinal direction of the attachment bore 52. Thus, the pushing force is restricted from concentrating in a narrow range of the attachment bore 52 (a narrow range in the longitudinal direction), a crack is restricted from being caused in a concrete wall provided with the attachment bore 52, and a securing force of the anchor bolt 50 with respect to the attachment bore 52 is prevented from decreasing due to such a crack.

Since the abutment parts 62 of the expandable member 58 fitted over the taper members 57a, 57b adjacent to each other are connected by the bridge 63, the abutment parts 62 can be treated together. For example, complexity of the production of the anchor bolts 50 can be more reduced than when the abutment parts 62 are made separately and then individually set so as to face the respective inclined surfaces 60 of the taper members 57a, 57b.

When the abutment parts 62 facing the inclined surfaces 60 of one of the taper members 57a are offset in the circumferential direction of the taper members 57a, 57b from the abutment parts 62 facing the inclined surfaces 60 of the other taper member 57b adjacent to the one of the taper members 57a, the pushing forces of the abutment parts 12 are distributed in the circumferential direction of the attachment bore 52 so that a crack is restricted from being caused in a concrete wall.

When three or five inclined surfaces 60 of the taper member 57a, 57b and three or five abutment parts 62 facing the respective inclined surfaces 60 are provided, a force pushing the inner peripheral surface 52a of the attachment bore 52 due to the abutment part 62 facing the inclined surface 60 of the taper member 57a, 57b is not vectorially and straightly aligned with any other pushing forces. As a result, one abutment part 62 and the other abutment part 62 in each taper member 57a, 57b do not push the inner peripheral surface 52a of the attachment bore 52 in the vectorially and straightly opposite directions, and the inner peripheral surface 52a of the attachment bore 52 is not excessively expanded so that a crack is surely restricted from being caused, for example, in a concrete wall.

EMBODIMENTS FOR PERFORMING THE INVENTION

An embodiment of an anchor bolt according to a first aspect of the present invention will be explained based on FIGS. 1-5. An anchor bolt 40 is configured to be inserted into and fixed (secured) in an attachment bore 2 provided (bored) upwardly, for example, in a wall surface 1 of a concrete ceiling (a concrete wall) (a state shown in FIG. 5).

Figure 1:
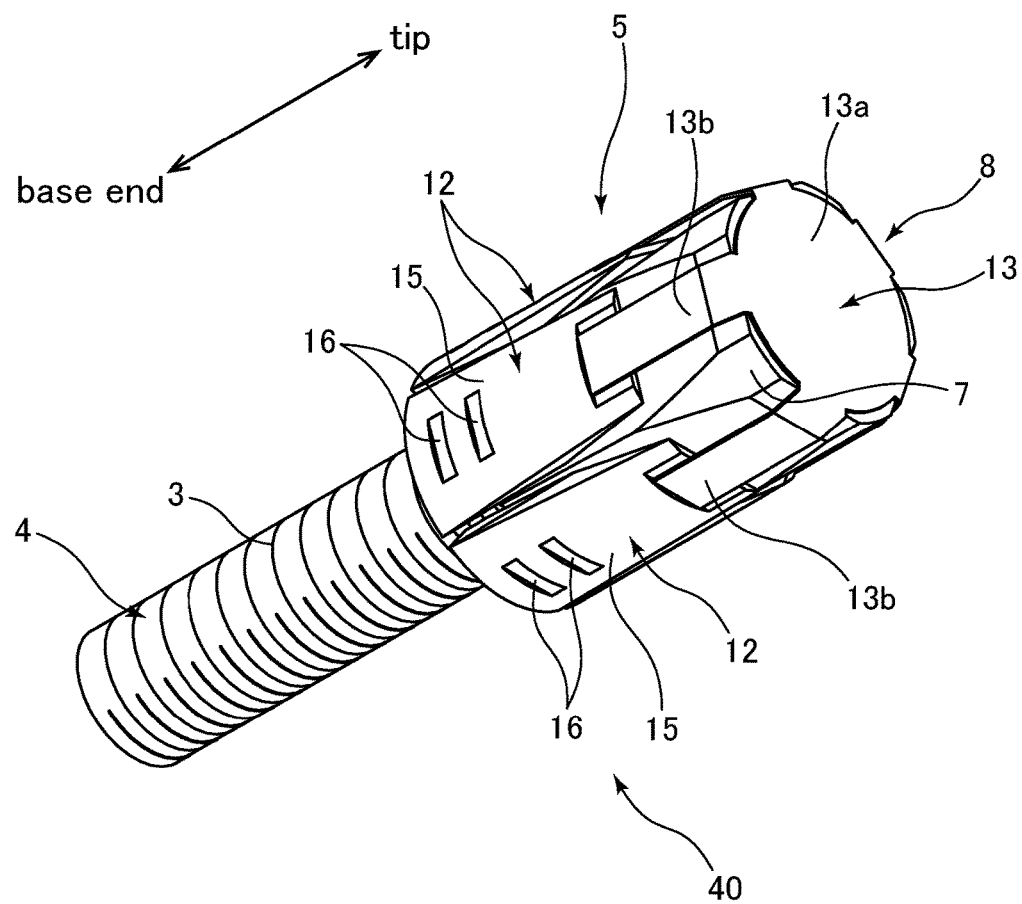
FIG. 1 is a perspective view of an anchor bolt according to a first aspect of the present invention.

As shown in FIG. 1, the anchor bolt 40 has a cylindrical rod 4 including an outer peripheral surface formed with an external thread 3, and expandable devices 5 for fixing the anchor bolt 40 on an inner peripheral surface 2a (see FIG. 4) of the attachment bore 2, and the inner peripheral surface 2a is a cylindrical surface. The expandable devices 5 are disposed at a tip (an upper end portion in FIG. 4) of the rod 4 and at least one intermediate location (one location in FIG. 4) in a longitudinal direction (up-down direction in FIG. 4) of the rod 4.

Figure 2:
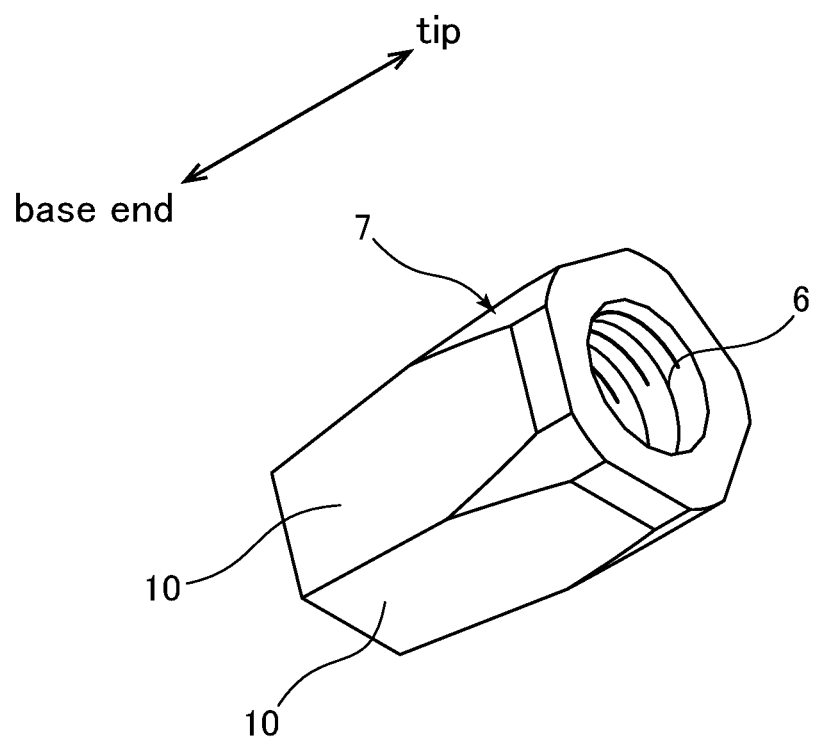
FIG. 2 is a perspective view of a taper member of the anchor bolt according to the first aspect of the present invention.
Figure 3:
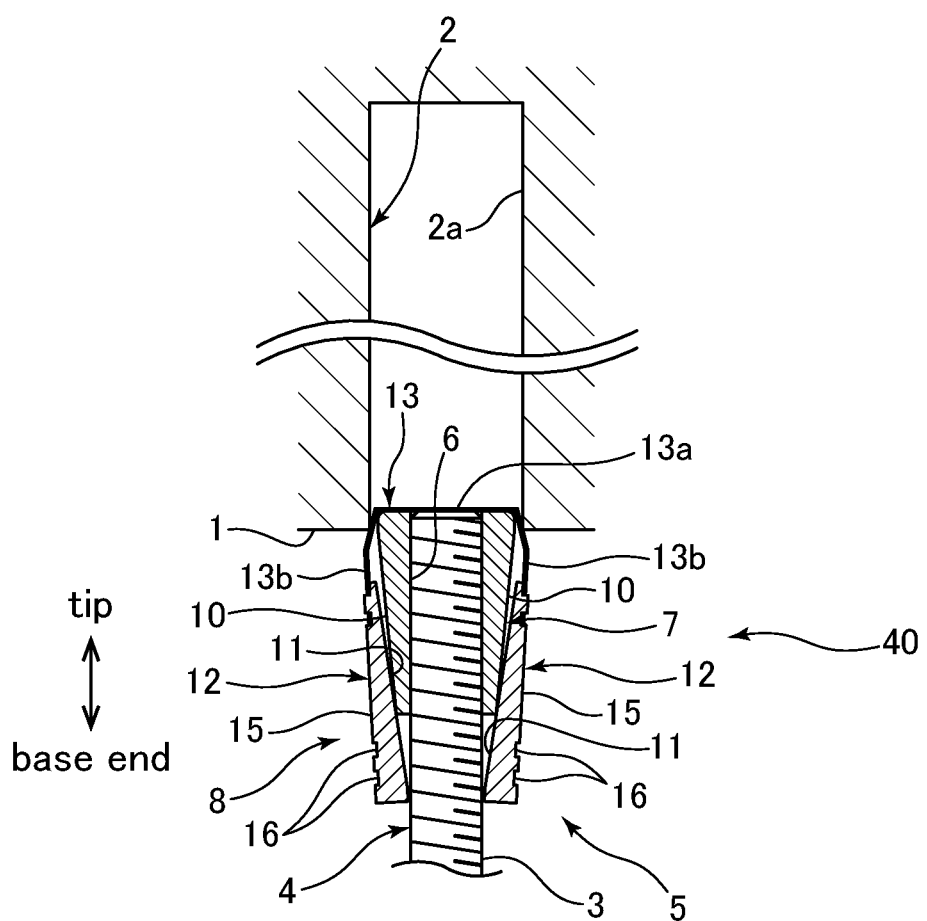
FIG. 3 is a longitudinal cross-sectional view showing a state of inserting the anchor bolt shown in FIG. 1 into an attachment bore.

As shown in FIGS. 2 and 3, each of the expandable device 5 has a taper member 7 and an expandable member 8 (FIG. 3) fitted over the taper member 7, and the taper member 7 includes a central axis, an outer peripheral surface, and planar inclined surfaces 10 which are formed in the outer peripheral surface and inclined so as to come closer to the central axis toward a base end (leftward in FIG. 2). The taper member 7 includes a through internal thread 6 along the central axis, and the internal thread 6 is configured to be threadably engaged with the external thread 3 of the rod 4 so that the rod 4 is connected to the taper member 7 by threadably engaging the external thread 3 of the rod 4 with the internal thread 6 of the taper member 7.

The outer peripheral surface of the taper member 7 is a cylindrical surface, and the inclined surfaces 10 are disposed at five locations in the outer peripheral surface of the taper member 7. The inclined surfaces 10 are equally spaced in a circumferential direction of the taper member 7 so that a cross-sectional surface of the taper member 7 orthogonal to the central axis is almost an equilateral pentagon (an equilateral odd-gon). The inclined surfaces 10 of the taper member 7 are not formed to a tip (right end in FIG. 2) of the taper member 7, so that upright surfaces are disposed nearer the tip than the inclined surfaces 10 of the taper member 7.

Figure 4:
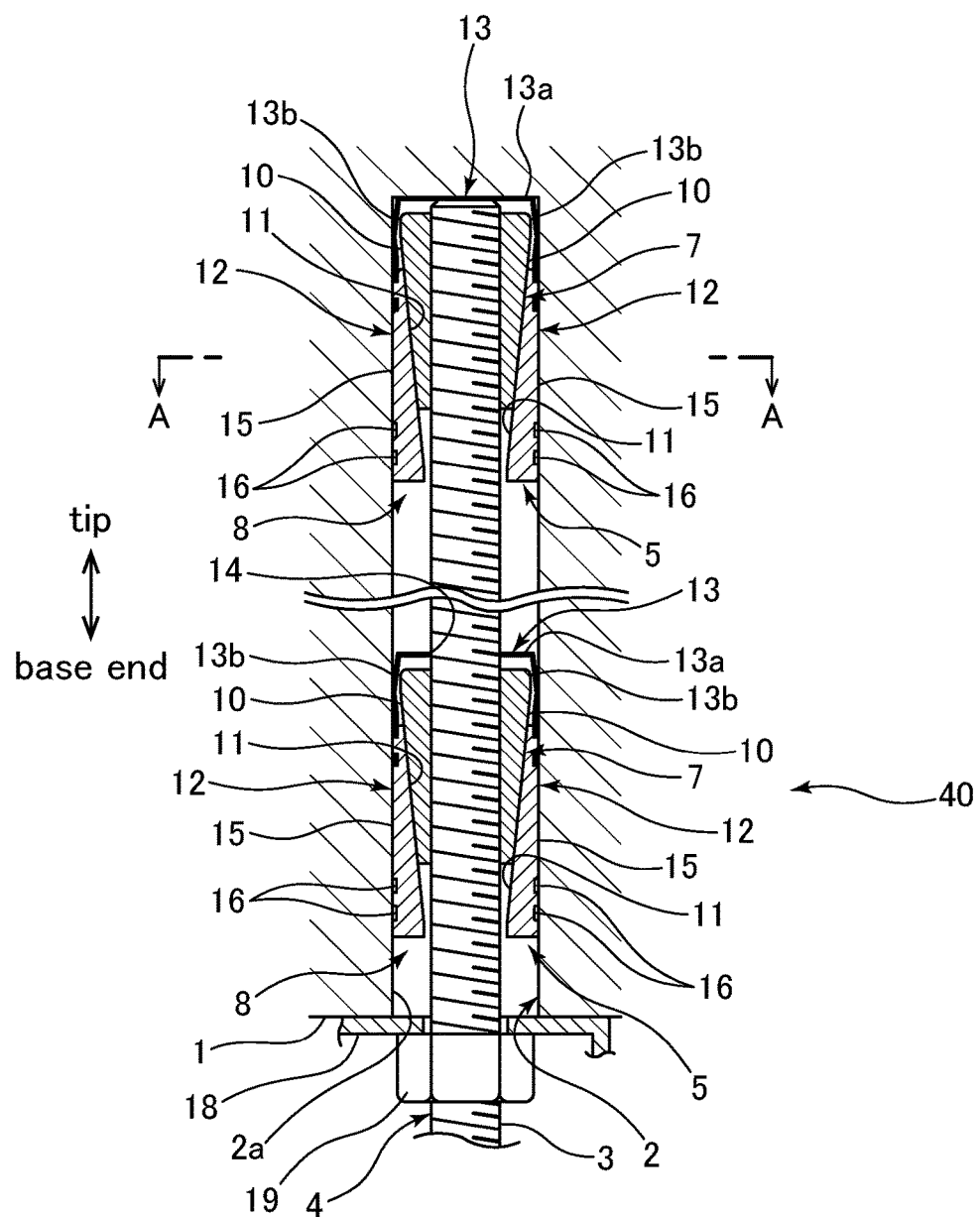
FIG. 4 is a longitudinal cross-sectional view showing a state of fixing the anchor bolt shown in FIG. 1 in the attachment bore.

As shown in FIGS. 1 and 4, each of the expandable members 8 has five abutment parts 12 and an elastically deformable bridge 13, the abutment parts 12 have inclined inner surfaces 11 which can abut (surface-contact) the respective inclined surfaces 10 of the taper member 7, and the bridge connects the tips (right ends in FIG. 1) of the abutment parts 12 with each other. Namely the number of the abutment parts 12 is the same as the number of the inclined surfaces 10. The abutment parts 12 are arranged so as to align with respective sides of the equilateral pentagon of the taper member 7.

In a state in which the inner surfaces 11 of the abutment parts 12 surface-contact the respective inclined surfaces 10 of the taper member 7 (a state shown in FIG. 4), the inner surfaces 12 are inclined so as to come closer to the central axis of the anchor bolt 40 (taper member 7) toward a base end (downward in FIG. 4) of the anchor bolt 40. An inclined angle of each inner surface 11 of the abutment part 12 is substantially equal to an inclined angle of each inclined surface 10 of the taper member 7.

As shown in FIGS. 1 and 3, the bridge 13 has a thin planar main body 13a located on a tip side of the rod 4, and five thin planar connecting parts 13b, each of which extends from an edge of the main body 13a in an outward and downward inclined direction with respect to the bridge 13 and is then bent inward toward the bridge 13 at a longitudinally intermediate portion of the connecting part 13b and each of which has a free end (left end in FIG. 1) connected to a tip of the abutment part 12. The free end of the connecting part 13b is connected to the tip of the abutment part 12 by means of swage or welding.

The main body 13a of the bridge 13 is connected to the connecting parts 13b at five circumferential locations. As shown in FIG. 3, when the anchor bolt 40 is pushed into the attachment bore 2, the intermediate portions of the connecting parts 13b abut an edge of an opening or the inner peripheral surface 2a of the attachment bore 2 and are pressed inward with respect to the bridge 13 (toward the rod 4) to be elastically deformed so that the intermediate portions of the connecting parts 13b and the abutment parts 12 are pressed against the inner peripheral surface 2a of the attachment bore 2 due to an elastic recovery force (a state shown in FIG. 4). Thus, the expandable member 8 is held (temporarily fixed) on the inner peripheral surface 2a of the attachment bore 2 so that the expandable member 8 is not easily removed from the attachment bore 2. In the expandable device 5 which is disposed at the intermediate location in the longitudinal direction of the rod 4, the main body 13a of the bridge 13 includes a circular through bore 14 at its center, into which the rod 4 can be inserted.

Each abutment part 12 includes an outer peripheral surface 15 which is a cylindrical surface like the inner peripheral surface 2a of the attachment bore 2 so that the outer peripheral surface 15 of each abutment part 12 can surface-contact the inner peripheral surface 2a of the attachment bore 2. The attachment part 12 includes an inner surface 11 which may not be inclined to the tip (upper end in FIG. 3) or the base end (lower end in FIG. 3) of the abutment part 12.

Equipment items, lines and so on (not shown) can be attached to the rod 4. The rod 4 and the taper member 7 are formed of, for example, stainless steel. Each abutment part 12 of the expandable member 8 is formed of aluminum alloy and so on, while the bridge 13 is formed of stainless steel and so on.

As shown in FIG. 1, in a lower portion (free end side) of the outer peripheral surface 15 of each abutment part 12 of the expandable member 8, a plurality of (two in the present embodiment) grooves 16 are provided and arranged next to each other in the longitudinal direction (right-left direction in FIG. 1) of the abutment part 12, and extend circumferentially on the outer peripheral surface 15 of the abutment part 12.

Next, an example of a procedure of fixing the anchor bolt 40 to the attachment bore 2 will be explained. Firstly the anchor bolt 40 is inserted into the attachment bore 2 of the wall surface 1 in an orientation (shown in FIG. 3) in which the tip of the rod 4 is directed upward. At that time, as shown in FIG. 3, the intermediate portions of the connecting parts 13b of the bridge 13 of the expandable device 5 disposed at the tip of the rod 4 abut the edge of the opening of the attachment bore 2, but by forcibly pressing the anchor bolt 40 into the attachment bore 2, each connecting part 13b is elastically deformed and the expandable device 5 and the rod 4 are inserted into the attachment bore 2.

The anchor bolt 40 is pushed until the expandable member 8 of the expandable device 5 disposed at the tip of the rod 4 abuts an upper surface (end surface) of the attachment bore 2 (a state shown in FIG. 4). At that time, due to the elastic recovery force of the connecting parts 13b of each expandable device 5, the intermediate portions of the connecting parts 13b and the abutment parts 12 are pressed against the inner peripheral surface 2a of the attachment bore 2 so that the expandable member 8 of each expandable device 5 is temporarily fixed on the inner peripheral surface 2a of the attachment bore 2 in an immovable and irrotational way due to friction and so on. As a result, the expandable member 8 of each expandable device 5 can be restricted from being moved upward and downward and being circumferentially rotated.

For example, when the rod 4 is rotated around its central axis, even if the taper member 7 tries to rotate along with the rotation of the rod 4, the inclined surfaces 10 of the taper member 7 would surface-contact (abut) the inner surfaces 11 of the abutment parts 12 of the expandable member 8 of each expandable device 5 which is temporarily fixed, so that the taper member 7 is restricted from being rotated, namely only up-down movement of the taper member 7 is allowed. Thus, when the rod 4 is rotated in a predetermined direction (a direction in which the taper member 7 is moved toward the opening of the attachment bore 2), only the taper member 7 is not rotated, but lowered (moved) toward the opening of the attachment bore 2 due to screwing action.

Further, as stated above, when the abutment parts 12 are pressed against the inner peripheral surface 2a of the attachment bore 2, upper and lower edges of the grooves 16 of the abutment parts 12 get stuck in the inner peripheral surface 2a of the attachment bore 2, so that the expandable member 8 is much more restricted from being moved in the up-down direction.

By lowering the taper member 7, the inclined surfaces 10 of the taper member 7 push the inner surfaces 11 of the abutment parts 12 of the expandable member 8 so as to move the abutment parts 12 toward the inner peripheral surface 2a of the attachment bore 2 (push each abutment part 12 toward the inner peripheral surface 2a of the attachment bore 2) and the outer peripheral surface 15 of each abutment part 12 is surely pressed against the inner peripheral surface 2a of the attachment bore 2. As a result, the anchor bolt 40 can be surely fixed (secured) in the attachment bore 2 by friction and so on between the outer peripheral surfaces 15 of the abutment parts 12 and the inner peripheral surface 2a of the attachment bore 2.

A bracket 18 (FIG. 4) for fixing facility items, lines and so on which are not shown is mounted to the external thread 3 of the rod 4 of the anchor bolt 40, and a nut 19 (FIG. 4) is threadably engaged with the external thread 3 under the bracket 18. Then, the nut 19 is fastened with a tool, such as a wrench (spanner), so that the bracket 18 is attached to the anchor bolt 40 (a state shown in FIG. 4).

When the nut 19 is fastened, the rod 4 is pulled downward so that the rod 4 and the taper member 7 are additionally lowered. Thus, the inner surface 11 of each abutment part 12 is additionally pushed toward the inner peripheral surface 2a of the attachment bore 2 by each inclined surface 10 of the taper member 7, and the outer peripheral surface 15 of each abutment part 12 is strongly pressed against the inner peripheral surface 2a of the attachment bore 2, so that the anchor bolt 40 is fixed in the attachment bore 2 more firmly. In this connection, instead of the bracket 18, a washer (not shown) may be mounted on the nut 19.

Even if the rod 4 of the anchor bolt 40 which is fixed in the attachment bore 2 is pulled downward by a weight of the facility item and so on, since the taper member 7 follows this pulling to strongly press the inner surface 11 of each abutment part 12, the outer peripheral surface 15 of each abutment part 12 is strongly pressed against the inner peripheral surface 2a of the attachment bore 2. Thus, the anchor bolt 40 can be surely prevented from being removed from the attachment bore 2.

Figure 5:
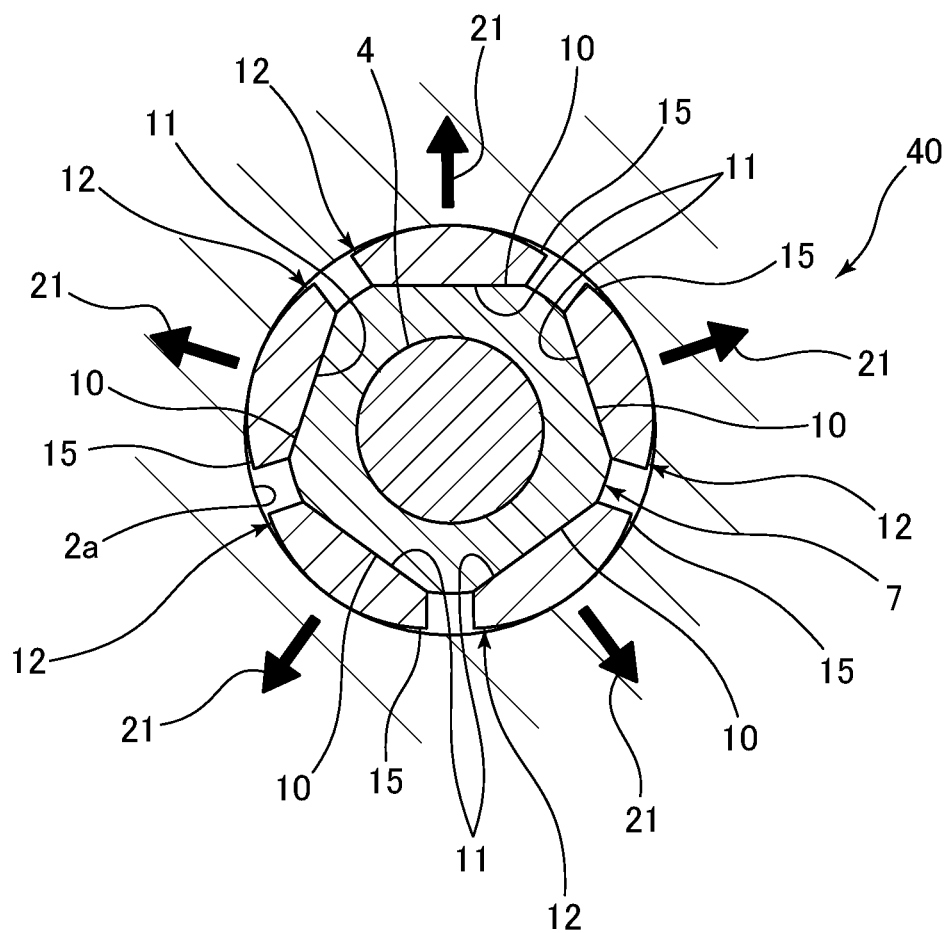
FIG. 5 is a cross-sectional view taken along a line A-A shown in FIG. 4.

In the anchor bolt 40 according to the present invention, as shown in FIG. 5, a force 21 pushing the inner peripheral surface 2a of the attachment bore 2 due to each abutment part 12 (referred to as "pushing force" hereinafter) is not vectorially and straightly aligned with any other pushing forces 21 due to the other abutment parts 12 so that the pushing forces 21 are distributed in a circumferential direction of the attachment bore 2. If a pushing force 21 due to one abutment part and the other pushing force 21 due to the other abutment part 12 pushed the inner peripheral surface 2a of the attachment bore 2 in the straightly opposite directions, a crack might occur in a concrete wall formed with the attachment bore 2, but such a crack can be restricted. As a result, a securing force of the anchor bolt 40 with respect to the attachment bore 2 is prevented from decreasing due to such a crack.

An embodiment of an anchor bolt according to a second aspect of the present invention will be explained based on FIGS. 6-11. An anchor bolt 50 is configured to be inserted into an attachment bore 52 from a tip side of the anchor bolt 50 and fixed (held) in the attachment bore 52 which are provided (bored) upwardly for example, in a wall surface 51 of a concrete ceiling (a concrete wall) (a state shown in FIG. 11).

Figure 6:
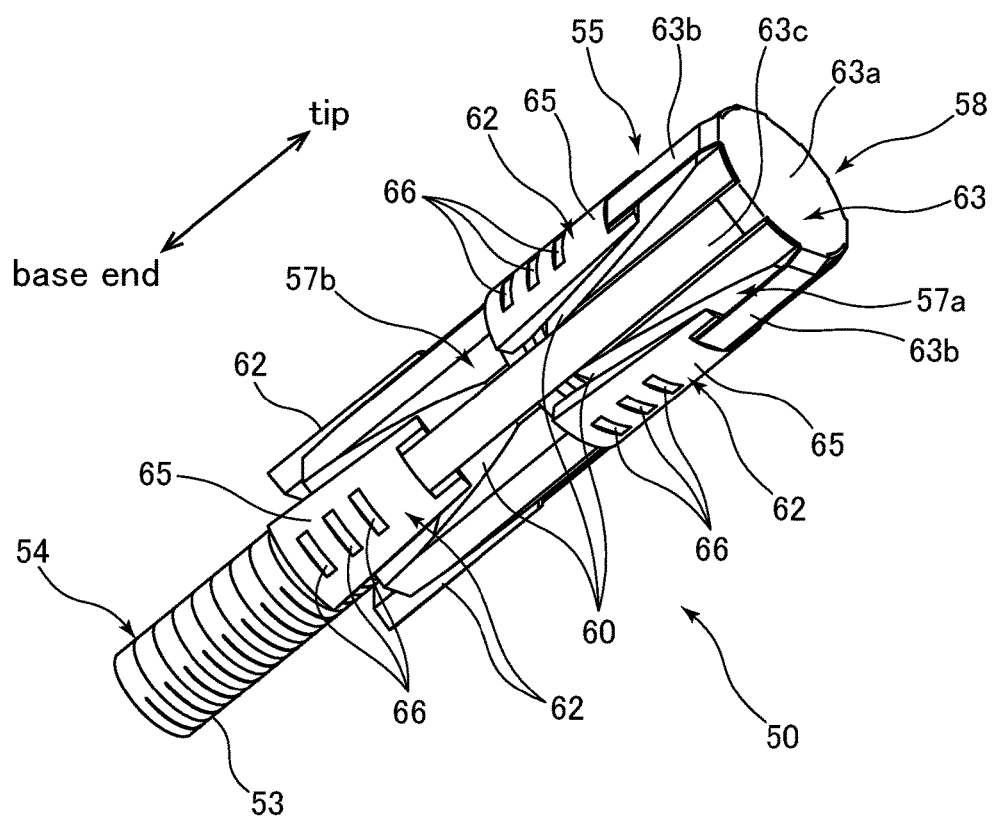
FIG. 6 is a perspective view of an anchor bolt according to a second aspect of the present invention.
Figure 10:
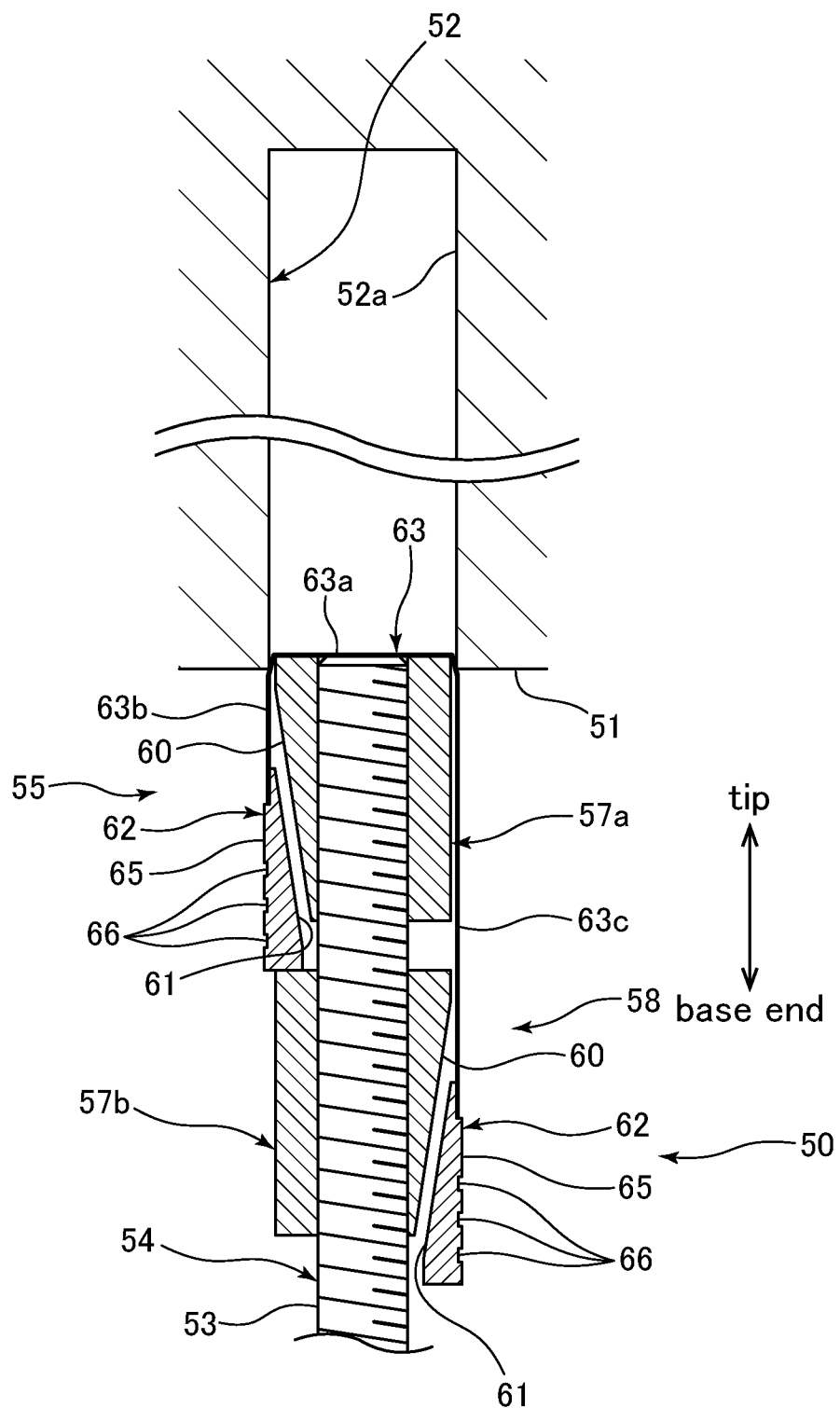
FIG. 10 is a longitudinal cross-sectional view showing a state of inserting the anchor bolt shown in FIG. 6 into an attachment bore.

As shown in FIGS. 6 and 10, the anchor bolt 50 has a cylindrical rod 54 including an outer peripheral surface formed with an external thread 53, and an expandable device 55 for fixing the anchor bolt 50 on an inner peripheral surface 52a of the attachment bore 52, and the inner peripheral surface 52a is a cylindrical surface. The expandable device 55 is disposed at a tip (an upper end portion in FIG. 10) of the rod 54.

Figure 7:
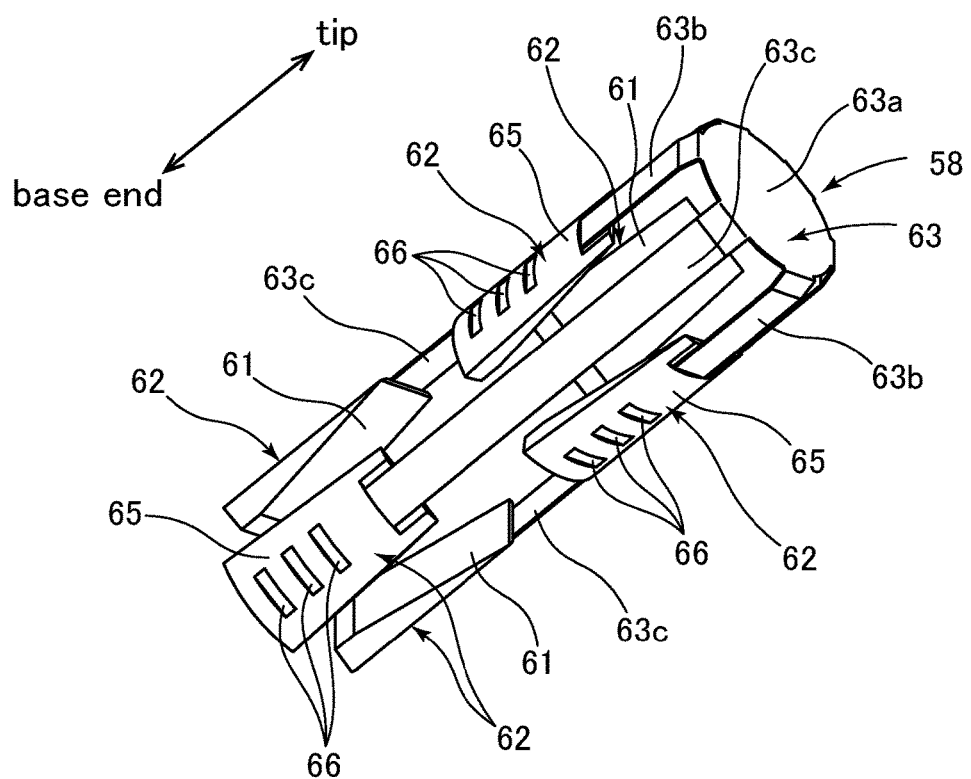
FIG. 7 is a perspective view of an expandable member of the anchor bolt according to the first aspect of the present invention.
Figure 8:
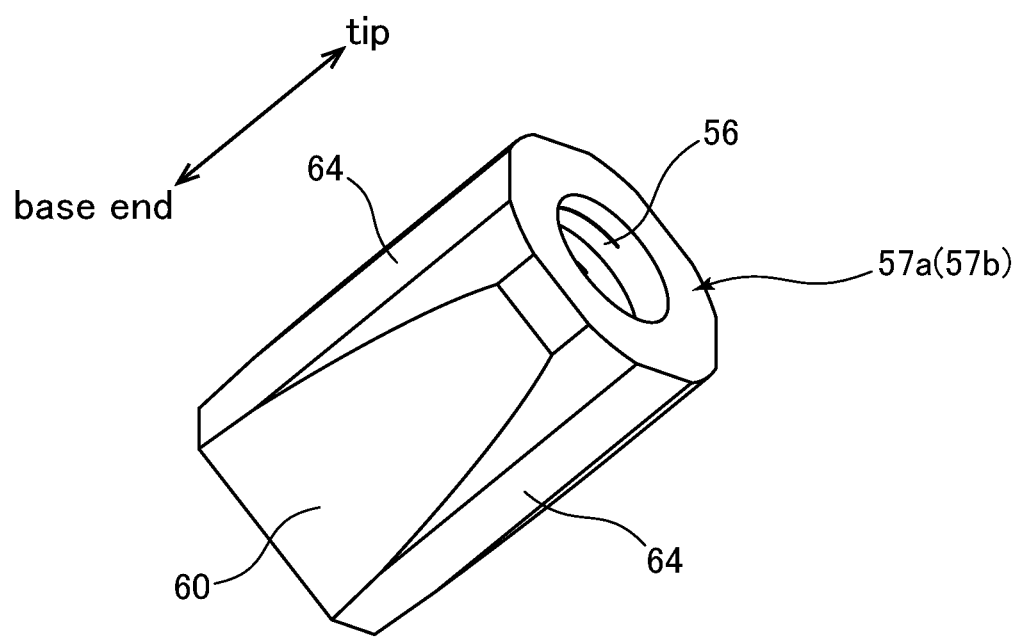
FIG. 8 is a perspective view of a taper member of the anchor bolt according to the first aspect of the present invention.

As shown in FIGS. 6 and 8, the expandable device 55 has upper and lower (left and right in FIG. 6) taper members 57a, 57b and an expandable member 58 (FIG. 7) fitted over the taper members 57a, 57b together, and each of the taper members includes a central axis, an outer peripheral surface, and planar inclined surfaces 60 (FIG. 10) which are formed in the outer peripheral surfaces and inclined so as to come closer to the central axis toward a base end (leftward in FIG. 8). Each taper member 57a, 57b includes a through internal thread 56 along the central axis, and the internal thread 56 is configured to be threadably engaged with the external thread 53 of the rod 54 so that the rod 54 is connected to the taper members 57a, 57b by threadably engaging the external thread 53 of the rod 54 with the internal threads 56 of the taper members 57a, 57b. The taper members 57a, 57b are positioned close to each other in a longitudinal direction eft-right direction in FIG. 6) of the rod 54.

The outer peripheral surfaces of the taper members 57a, 57b are cylindrical surfaces, and the inclined surfaces 60 are disposed at three locations in the outer peripheral surface of each taper member 57a, 57b. The inclined surfaces 60 are equally spaced in a circumferential direction of each taper member 57a, 57b. Namely, viewing from a base end (left end in FIG. 8) of the anchor bolt 50, each taper member 57a, 57b has the inclined surfaces 60 at respective sides of the equilateral triangle. The inclined surfaces 60 of each taper member 57a, 57b are not formed to a tip (right end in FIG. 8) of the taper members 57a, 57b, so that upright surfaces are disposed nearer the tip than the inclined surfaces 10 of each taper member 57a, 57b.

As shown in FIGS. 6 and 7, the expandable member 58 has a plurality of (six in the present embodiment) abutment parts 62 and an elastically deformable bridge 63 connecting the abutment parts 62 with each other. The abutment parts 62 have inclined inner surfaces 61 which can surface-contact the respective inclined surfaces 60 of the taper members 57a, 57b, and in a state in which the inner surfaces 61 surface-contact the respective inclined surfaces 60 (in a state shown in FIG. 11), the inner surfaces 12 are inclined so as to come closer to the central axis of the anchor bolt 50 (taper members 57a, 57b) toward the base end (downward in FIG. 11) of the anchor bolt 50. An inclined angle of each inner surface 61 of the abutment part 62 is substantially equal to an inclined angle of each inclined surface 60 of the taper members 57a, 57b.

As shown in FIGS. 6 and 7, the bridge 63 has a thin planar main body 63a located on a tip side (right side in FIG. 6) of the anchor bolt 50 than the taper members 57a, 57b, and six longer and shorter thin planar connecting parts 63b, 63c, each of which extends from a peripheral edge of the main body 63a in an outward and downward inclined direction with respect to the bridge 63 and is then bent inward toward the bridge 63 at a longitudinally intermediate portion of the connecting part 63b, 63c and each of which has a free end (left end in FIG. 6) connected to a tip of the abutment part 62.

Specifically, the three shorter connecting parts 63b of the six connecting parts 63b, 63c are connected to the tips of the abutment parts 62 facing the respective inclined surfaces 60 of the one taper member 57a which is nearer the tip of the anchor bolt 50 (right side in FIG. 6). The three longer connecting parts 63c are connected to the tips of the abutment parts 62 facing respective inclined surfaces 60 of the other taper member 57b which is nearer the base end of the anchor bolt 50 than the one taper member 57a. Shapes of the abutment parts 62 are the same as each other.

Figure 9:
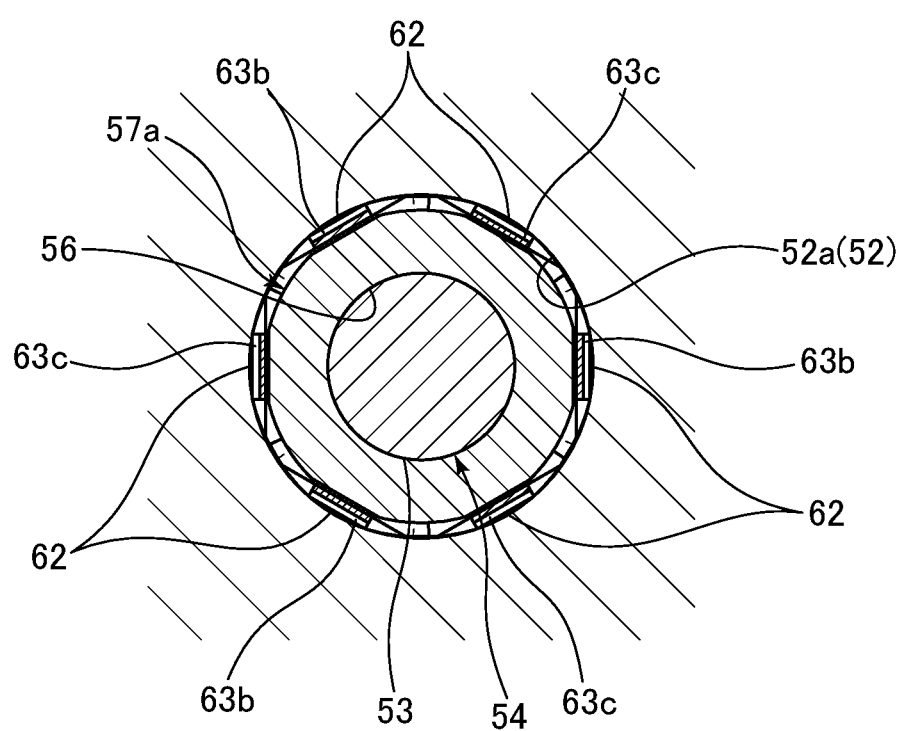
FIG. 9 is a cross-sectional view taken along a line A-A shown in FIG. 11.

As shown in FIG. 9, the connecting parts 63b, 63c of the bridge 63 are arranged so that the shorter connecting parts 63b and the longer connecting parts 63c are alternated and equally spaced in a circumferential direction of the taper members 57a, 57b (main body 63a). Thus, viewing from the tip of the anchor bolt 50, the abutment parts 62 facing the inclined surfaces 60 of the one taper member 57a and the abutment parts 62 facing the inclined surfaces 60 of the other taper member 57b adjacent to the one taper member 57a are offset in the circumferential direction of the taper members 57a, 57b.

Specifically; viewing from the tip of the anchor bolt 50, each abutment part 62 facing the inclined surface 60 of the other taper member 57b is arranged between the abutment parts 62 facing the inclined surfaces 60 of the one taper member 57 (see FIG. 7). According to this arrangement of the abutment parts 62, the taper members 57a, 57b are arranged so that viewing from the tip of the anchor bolt 50, each inclined surface 60 of the other taper member 57b is arranged between the inclined surfaces 60 of the one taper member 57a.

Namely the other taper member 57b is offset with respect to the one taper member 57a by 60 degrees in a rotational (circumferential) direction. The bridge 63 is formed so that lengths of the three shorter connecting parts 63b are equal to each other and lengths of the three longer connecting parts 63c are equal to each other.

As shown in FIG. 8, each taper member 57a, 57b includes cutouts 14 in the outer peripheral surface between the inclined surfaces 60 in order to prevent interference between the connecting parts 63c and the outer peripheral surface of the taper member 57a, and the cutouts straightly extend in a longitudinally direction (left-to-right direction in FIG. 8) of the taper member 57a, 57b. In order to make shapes of the one taper member 57a and the other taper member 57b the same as each other, the cutouts 64 are formed in both of the taper members 57a, 57b. The free end of each connecting part 63b, 63c is connected the tip of each abutment part 62 by means of swage, welding and so on.

Figure 11:
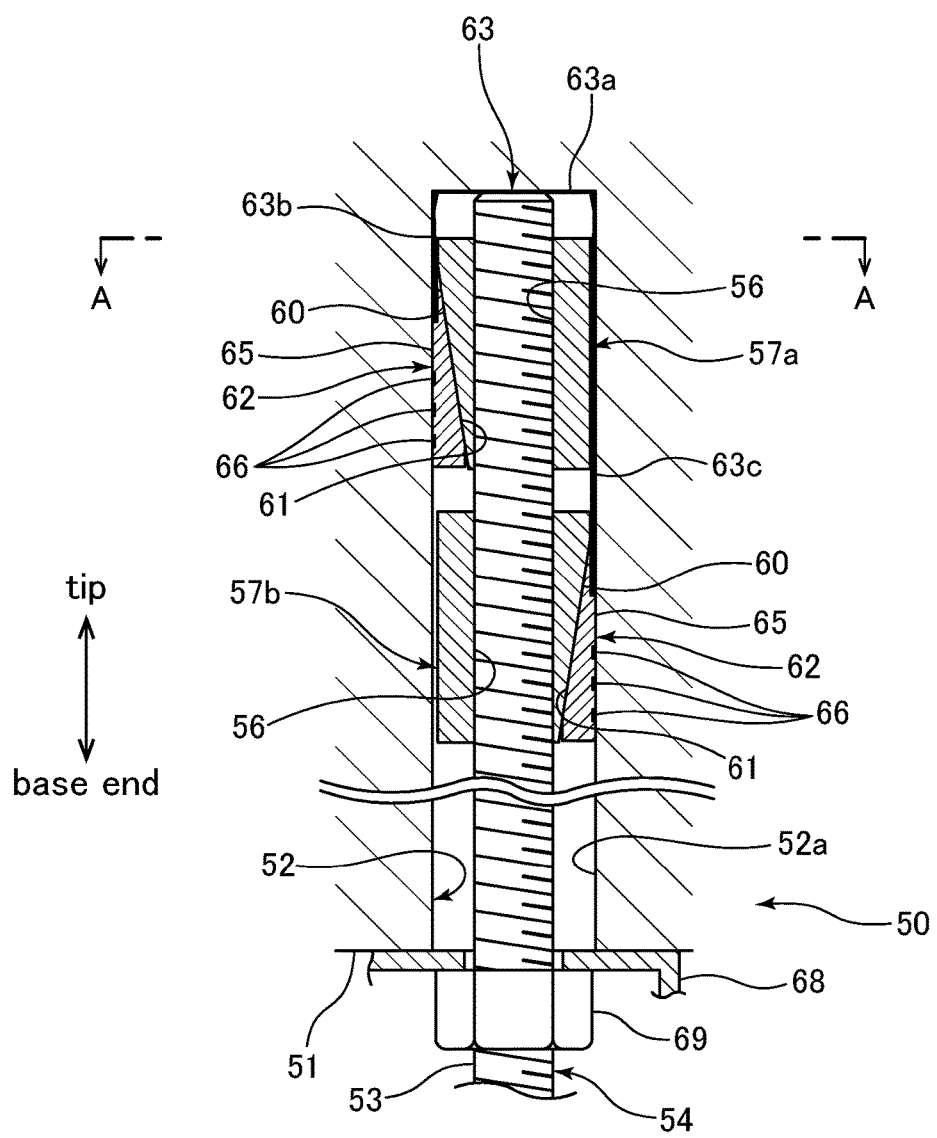
FIG. 11 is a longitudinal cross-sectional view showing a state of fixing the anchor bolt shown in FIG. 6 in the attachment bore.

As shown in FIG. 10, when the anchor bolt 50 is pushed into the attachment bore 52, the intermediate portions of the connecting parts 63b, 63c abut an edge of an opening or the inner peripheral surface 52a of the attachment bore 52 and are pressed inward with respect to the bridge 63 (toward the rod 54) to be elastically deformed so that the intermediate portions of the connecting parts 63b, 63c and the abutment parts 62 are pressed against the inner peripheral surface 52a of the attachment bore 52 due to an elastic recovery force (a state shown in FIG. 11). Thus, the expandable member 58 is held (temporarily fixed) on the inner peripheral surface 52a of the attachment bore 52 so that the expandable member 58 is not easily removed from the attachment bore 52.

Each abutment part 62 includes an outer peripheral surface 65 which is a cylindrical surface like the inner peripheral surface 52a of the attachment bore 52 so that the outer peripheral surface 65 of each abutment part 62 can surface-contact the inner peripheral surface 52a of the attachment bore 52. The attachment part 62 includes an inner surface 61 which may not be inclined to the tip (upper end in FIG. 10) or the base end (lower end in FIG. 10) of the abutment part 62.

Equipment items, lines and so on (not shown) can be attached to the rod 54. The rod 54 and the taper members 57a, 57b are formed of for example, stainless steel. Each abutment part 62 of the expandable member 58 is formed of aluminum alloy and so on, while the bridge 63 is formed of stainless steel and so on.

In a lower portion (free end side) of the outer peripheral surface 65 of each abutment part 62 of the expandable member 58, a plurality of (three in the present embodiment) grooves 66 are provided and arranged next to each other in the longitudinal direction of the abutment part 62, and extend circumferentially on the outer peripheral surface 65 of the abutment part 62.

Next, an example of a procedure of fixing the anchor bolt 50 to the attachment bore 52 will be explained. Firstly, the anchor bolt 50 is inserted into the attachment bore 52 in an orientation (shown in FIG. 10) in which the tip of the rod 54 is directed upward. At that time, as shown in FIG. 10, the intermediate portions of the connecting parts 63b, 63c of the bridge 63 of the expandable device 55 abut the edge of the opening of the attachment bore 52, but by forcibly pressing the anchor bolt 50 into the attachment bore 52, each connecting part 63b, 63c is elastically deformed and the expandable device 55 and the rod 54 are inserted into the attachment bore 52.

The anchor bolt 50 is pushed until the expandable member 58 of the expandable device 55 abuts an upper surface (end surface) of the attachment bore 52 (a state shown in FIG. 11). At that time, due to the elastic recovery force of the connecting parts 63b, 63c of the expandable device 55, the intermediate portions of the connecting parts 63b, 63c and the abutment parts 62 are pressed against the inner peripheral surface 52a so that the expandable member 58 of the expandable device 55 is temporarily fixed on the inner peripheral surface 52a of the attachment bore 52 in an immovable and irrotational way due to friction and so on. As a result, the expandable member 58 of the expandable device 5 can be restricted from being moved upward and downward and being circumferentially rotated.

For example, when the rod 54 is rotated around its central axis, even if the taper members 57a, 57b try to rotate along with the rotation of the rod 54, the inclined surfaces 60 of the taper members 57a, 57b would surface-contact (abut) the inner surfaces 61 of the abutment parts 62 of the expandable member 58 of the expandable device 55 which is temporarily fixed, so that the taper members 57a, 57b are restricted from being rotated, namely, only up-down movements of the taper members 57a, 57b are allowed. Thus, when the rod 54 is rotated in a predetermined direction (a direction in which the taper members 57a, 57b are moved toward the opening of the attachment bore 52), only the taper members 57a, 57b are not rotated, but lowered (moved) toward the opening of the attachment bore 52 due to screwing action.

Further, as stated above, when the abutment parts 62 are pressed against the inner peripheral surface 52a of the attachment bore 52, upper and lower edges of the grooves 66 of the abutment parts 62 get stuck in the inner peripheral surface 52a of the attachment bore 52, so that the expandable member 58 is much more restricted from being moved in the up-down direction.

By lowering the taper members 57a, 57b, the inclined surfaces 60 of the taper members 57a, 57b push the inner surfaces 61 of the abutment parts 62 of the expandable member 58 so as to move the abutment parts 62 toward the inner peripheral surface 52a of the attachment bore 52, and the outer peripheral surface 65 of each abutment part 62 is surely pressed against the inner peripheral surface 52a of the attachment bore 52. As a result, the anchor bolt 50 can be surely fixed in the attachment bore 52 by friction and so on between the outer peripheral surfaces 65 of the abutment parts 62 and the inner peripheral surface 52a of the attachment bore 52.

A bracket 68 (FIG. 11) for fixing facility items, lines and so on which are not shown is mounted to the external thread 53 of the rod 54 of the anchor bolt 50, and a nut 69 (FIG. 11) is threadably engaged with the external thread 53 under the bracket 68. Then, the nut 69 is fastened with a tool, such as a wrench (spanner), so that the bracket 68 is attached to the anchor bolt 50 (a state shown in FIG. 11).

When the nut 69 is fastened, the rod 54 is pulled downward so that the rod 54 and the taper members 57a, 57b are additionally lowered. Thus, the inner surface 61 of each abutment part 62 is additionally pushed toward the inner peripheral surface 52a of the attachment bore 52 by each inclined surface 60 of each taper member 57a, 57b, and the outer peripheral surface 65 of each abutment part 62 is strongly pressed against the inner peripheral surface 52a of the attachment bore 52, so that the anchor bolt 50 is fixed in the attachment bore 52 more firmly. In this connection, instead of the bracket 68, a washer (not shown) may be mounted on the nut 69.

Even if the rod 54 of the anchor bolt 50 which is fixed in the attachment bore 52 is pulled downward by a weight of the facility item and so on, since the taper members 57a, 57b follow this pulling to strongly press the inner surface 61 of each abutment part 62, the outer peripheral surface 65 of each abutment part 62 is strongly pressed against the inner peripheral surface 52a of the attachment bore 52. Thus, the anchor bolt 50 can be surely prevented from being removed from the attachment bore 52.

In the anchor bolt 50 according to the present invention, the expandable device 55 has two taper members 57a, 57b for pushing the abutment parts 62 toward the inner peripheral surface 52a of the attachment bore 52, and the abutment parts 62 are arranged so as to face the respective inclined surfaces 60 of the taper members 57a, 57b. Further, since the inclined surfaces 60 of the taper members 57a, 57b and the abutment parts 62 of the expandable member 57 are equally spaced in the circumferential direction of the taper members 57a, 57b, and viewing from the tip of the anchor bolt 50, the abutment parts 62 facing the inclined surfaces 60 of the one taper member 57a and the abutment parts 62 facing the inclined surfaces 60 of the other taper member 57b are offset in the circumferential direction of the taper members 57a, 57b, the abutment parts 62 are distributed in the longitudinal direction and the circumferential direction, so that forces pushing the inner peripheral surface 52a of the attachment bore 52 due to the abutment parts 62 are restricted from concentrating in a narrow range of the attachment bore 52. Thus, a crack is restricted from being caused in a concrete wall provided with an attachment bore.

Since the abutment parts 62 fitted over the adjacent taper members 57a, 57b are connected to each other via the bridge 63, the abutment parts 62 can be integrally formed so that positional relationship between abutment parts 62 can be accurately set.

Since each taper member 57a, 57b has three inclined surfaces 60 and the expandable member 58 has the respective abutment parts 62, a force pushing the abutment part 62 toward the inner peripheral surface 52a of the attachment bore 52 by the taper member 57a, 57b is not vectorially and straightly aligned with any other forces 21 pushing the other abutment parts 62. If one abutment part 62 and the other abutment part 62 facing the inclined surfaces 60 of the taper member 57 pushed the inner peripheral surface 52a of the attachment bore 52 in the straightly opposite directions, the inner peripheral surface 52a of the attachment bore 52 would have been excessively expanded and a crack might occur in a concrete wall, but such a crack can be restricted.

Another expandable device or devices may be disposed at an intermediate location in the longitudinal direction of the rod 54. Then, in the expandable device 55 which is disposed at the intermediate location in the longitudinal direction of the rod 54, the main body 63a of the bridge 63 includes a through bore, into which the rod 54 can be inserted. The expandable device 55 may have three or more taper members 57a, 57b. According to the number of the taper members 57a, 57b, the number of the abutment parts 62 of the expandable member 58 may be determined and the number and the length of the connecting parts 63b, 63c of the bridge 63 may be determined.

1: wall surface
2: attachment bore
2a: inner peripheral surface of attachment bore
3: external thread of rod
4: rod
5: expandable device
6: internal thread of taper member
7: taper member
10: inclined surface of taper member
11: inner surface of abutment part
12: abutment part
13: bridge
15: outer peripheral surface of abutment part
20: anchor bolt
50: anchor bolt
51: wall surface
52: attachment bore
52a: inner peripheral surface of attachment bore
54: rod
57a: one taper member
57b: the other taper member
58: expandable member
60: external peripheral
61: inner surface of abutment part
62: abutment part
63: bridge
63a: main body
63b: shorter connecting part
63c: longer connecting part
65: outer peripheral surface of abutment part

What is claimed is:

1. An anchor bolt which is inserted into and fixed in an attachment bore provided in a wall surface comprising:
   a rod;
   a taper member connected to the rod;
   three or five abutment parts fitted over the taper member; and
   an elastically deformable bridge connecting the abutment parts with each other;
   wherein the taper member has a central axis, a cross section orthogonal to the central axis in a form of an equilateral triangle or pentagon, and three or five inclined surfaces at respective sides of the triangle or pentagon, the inclined surfaces being inclined closer to the central axis of the taper member toward a base end of the anchor bolt,
   wherein the number of the abutment parts is the same as the number of the inclined surfaces of the taper member, and each of the abutment part has an inner surface which is inclined closer to the central axis of the taper member toward the base end and which abuts the inclined surface of the taper member,
   wherein in a state in which the taper member and the abutment parts are inserted into the attachment bore from a tip side of the anchor bolt, when only the taper member is moved toward an opening of the attachment bore, the abutment parts are pushed toward an inner peripheral surface of the attachment bore due to the inclined surfaces of the taper member, and outer peripheral surfaces of the abutment parts are pressed against the inner peripheral surface of the attachment bore so that the abutment parts are fixed in the attachment bore
   wherein the bridge includes a main body disposed on a tip side of the rod and connecting parts extending from an edge of the main body and connected to tips of the abutment parts,
   wherein the connecting part extends from the edge of the main body in an outward and inclined direction with respect to the bridge and is then bent inward toward the bridge at a longitudinally intermediate portion of the connecting part, and the connecting part has a free end connected to the tip of the abutment part, and
   wherein when the anchor bolt is pushed into the attachment bore, the intermediate portions of the connecting parts are pressed by an edge of an opening or the inner peripheral surface of the attachment bore to be elastically deformed so that the intermediate portions of the connecting parts and the abutment parts are pressed against the inner peripheral surface of the attachment bore due to an elastic recovery force.

2. The anchor bolt according to claim 1,
wherein the rod has an outer peripheral surface formed with an external thread, the taper member has an internal thread along the central axis, and the rod is connected to the taper member by threadably engaging the external thread with the internal thread.

3. An anchor bolt which is inserted into an attachment bore provided in a wall surface from a tip side of the anchor bolt and is fixed in the attachment bore, comprising:
a rod;
at least two taper members connected to the rod so as to be close to each other; and
an expandable member fitted over the taper members together;
wherein each taper member has a central axis and an outer peripheral surface formed with inclined surfaces inclined closer to the central axis of the taper member toward a base end of the anchor bolt,
wherein the expandable member has a plurality of abutment parts and a bridge connecting the abutment parts with each other, each abutment part having an inner surface which surface-contacts the inclined surface of the taper member,
wherein the bridge has a main body disposed closer to a tip of the anchor bolt than the taper members, and a plurality of connecting parts, the connecting parts extending from a peripheral edge of the main body toward the respective abutment parts and have respective free ends connected to tips of the respective abutment parts, and
wherein in a state in which the taper members and the expandable member are inserted into the attachment bore, when the taper members are moved toward an opening of the attachment bore, the abutment parts are pushed toward an inner peripheral surface of the attachment bore due to the inclined surfaces of the taper members, and outer peripheral surfaces of the abutment parts are pressed against the inner peripheral surface of the attachment bore so that the abutment parts are fixed in the attachment bore
wherein the connecting part extends from the peripheral edge of the main body in an outward and inclined direction with respect to the bridge and is then bent inward toward the bridge at a longitudinally intermediate portion of the connecting part, and the connecting part has a free end connected to the tip of the abutment part, and
wherein when the anchor bolt is pushed into the attachment bore, the intermediate portions of the connecting parts are pressed by an edge of an opening or the inner peripheral surface of the attachment bore to be elastically deformed so that the intermediate portions of the connecting parts and the abutment parts are pressed against the inner peripheral surface of the attachment bore due to an elastic recovery force.

4. The anchor bolt according to claim 3,
wherein, viewing from the tip of the anchor bolt, the abutment parts facing the inclined surfaces of one of the taper members are offset in a circumferential direction of the taper members from the abutment parts facing the inclined surfaces of the other taper member adjacent to the one of the taper members.

5. The anchor bolt according to claim 4,
wherein for each taper member, three or five inclined surfaces of the taper member and three or five abutment parts facing the respective inclined surfaces are provided,
wherein the inclined surfaces of the taper members and the abutment parts facing the respective inclined surfaces are equally spaced in the circumferential direction of the taper members, and
wherein viewing from the tip of the anchor bolt, the abutment parts facing the respective inclined surfaces of the other taper member adjacent to the one of the taper members are disposed between the abutment parts facing the respective inclined surfaces of the one of the taper members.

* * * * *